No. 809,182. PATENTED JAN. 2, 1906.
P. HAASE.
DUSTING MACHINE FOR CANDY.
APPLICATION FILED JAN. 24, 1905.
2 SHEETS—SHEET 2.
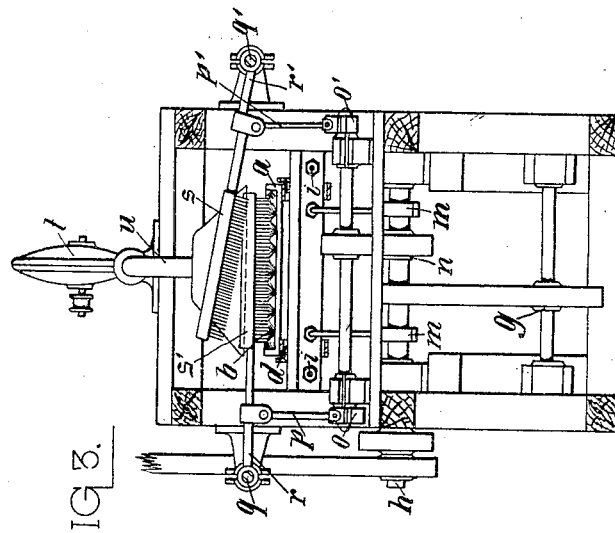
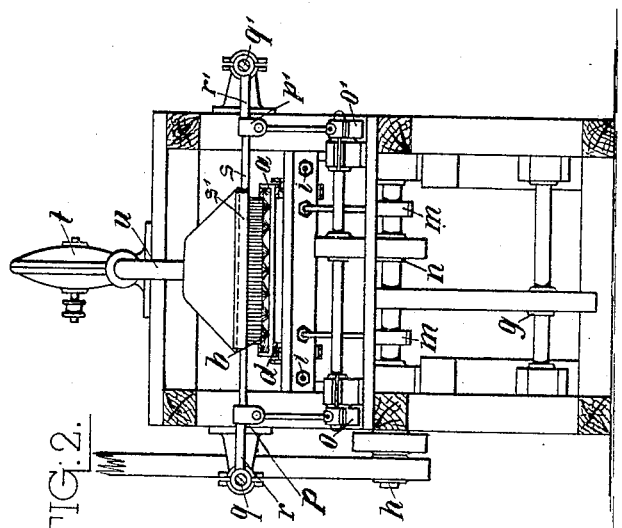

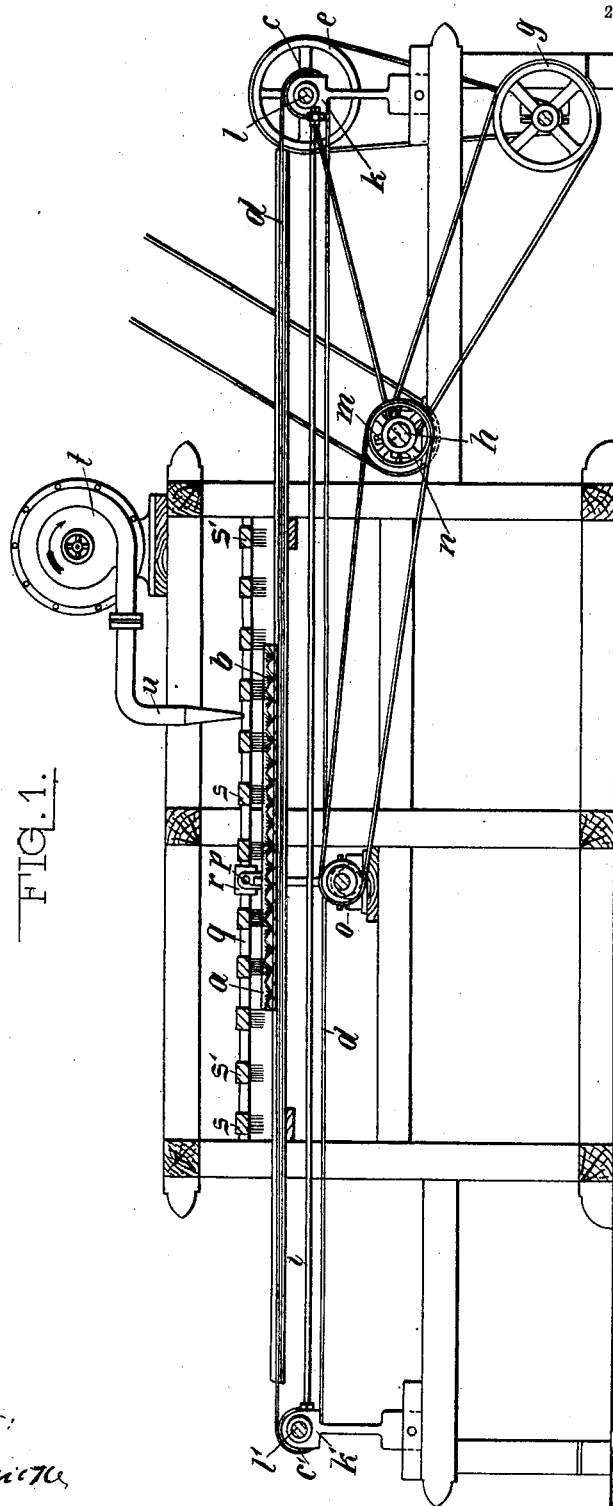

UNITED STATES PATENT OFFICE.

PAUL HAASE, OF PÖSSNECK, GERMANY.

DUSTING-MACHINE FOR CANDY.

No. 809,182.　　　Specification of Letters Patent.　　　Patented Jan. 2, 1906.

Application filed January 24, 1905. Serial No. 242,573.

*To all whom it may concern:*

Be it known that I, PAUL HAASE, a subject of the Emperor of Germany, residing at Pössneck, Saxe-Meiningen, Germany, have invented certain new and useful Improvements in Dusting-Machines for Candy, of which the following is a full, clear, and exact specification.

The present invention relates to a machine for dusting fine candy goods made of sugar and inclosing any kind of filling.

The essential parts of the machine are, first, an endless apron, with a receptacle for the candy lined with brushes or brooms and receiving during the feed motion a shaking in order to expose all sides of the candy pieces to the brushes; second, brushes or brooms arranged above the feed-apron and provided with means to impart to them an up-and-down going or beating motion to act on the pieces of candy while they are traveling in their receptacle under said brushes; third, a ventilator adapted to blow constantly on the pieces of candy while passing under the mouthpiece of said ventilator, thereby removing the loose parts of sugar-dust and impurities.

In the accompanying drawings, forming part of this specification, Figure 1 shows the machine in side elevation, partly in section. Fig. 2 is an end elevation showing different parts in section and showing the beating-brushes in the lowest position. Fig. 3 is an end elevation similar to Fig. 2, showing the beating-brooms on one side in elevated position.

A receptacle $a$, having bottom and sides lined with brushes $b$, is adapted to be placed on a feed-apron $d$ when charged with candy, which is guided over rollers $c$ and $c'$ at both ends of the machine. The roller $c$ receives motion from the main shaft $h$ (which is driven by a belt-pulley or cog-wheel) by means of pulleys $g$ and $e$, which are connected by driving-belts in a well-known manner, as shown in Fig. 1.

The bearings of the shafts $l\ l'$ for the rollers $c\ c'$ (designated in the drawings by the letters $k\ k'$) are supported on thin vertical arms, being slightly resilient, so that the bearings can execute a swinging motion. Connecting-rods $i$, moving from one bearing to the other, compel said bearings to swing in unison. A swinging motion is imparted to said bearings by eccentrics $m$ on the main shaft $h$ and eccentric-rods connected to said eccentrics being attached with the free end to the bearings $l$. A belt-pulley $n$ on the main shaft $h$ transfers motion to a counter-shaft $o$, suitably journaled on the frame, which carries at the outer ends eccentrics $o\ o'$.

By means of the eccentric-rods $p\ p'$, which are pivotally connected to the arms $r\ r'$ of the beating-brushes $s\ s'$, the latter are alternately moved up and down, being oscillated around their pivots $q\ q'$, so that the brushes act on the candy, cleaning the same and removing loose particles of sugar and impurities.

$t$ is a ventilator, being provided with a mouthpiece $u$, presenting a broad slit opening across the travel of the receptacle $a$. A steady current of air produced by the ventilator removes all dust and dirt from the candy. When the receptacle charged with a layer of candy is placed upon the apron $d$ at the left end of the machine over the roller $c'$, it may be secured to the apron by any convenient means. The apron feeds the receptacle through the machine, exposing the candy to the action of the beating-brushes and imparting to the same all the time a shaking or vibratory motion in a horizontal plane, said motion being produced by the eccentrics $m\ m$. When the receptacle arrives at the opposite end of the machine, it is disconnected from the apron and the purified candy is discharged.

Having thus described my invention, what I claim is—

1. In a candy-cleaning apparatus, the combination of an endless traveling apron, means for shaking the apron in its course of travel, a candy-receptacle carried by the apron, brushes for cleaning the candy as the receptacle travels and reciprocates with the apron, means for operating the brushes, and means for discharging the dust and removed impurities from the receptacle.

2. In a candy-cleaning apparatus the combination of a continuously-traveling shaking-apron, a receptacle carried thereby and lined with brushes, movable brushes coöperating with the brushes in the receptacle to remove the dust and impurities from the candy therein, means for discharging the removed dust and impurities from the receptacle.

3. In a candy-cleaning apparatus, the combination of a continuously-traveling shaking-apron, a receptacle carried thereby, brushes for cleaning the candy in the receptacle in its course of travel with the apron, means for operating the apron and brushes, and means for delivering a blast of air against the candy in the receptacle to discharge the removed dust and impurities therefrom.

4. In a candy-cleaning apparatus, the combination of a continuously-traveling shaking-apron, a candy-receptacle carried thereby, brushes pivoted to swing downward into the receptacle and remove the dust and impurities from the candy contained therein, eccentrics for operating said brushes, means for actuating the apron and eccentrics, and means for discharging the removed dust and impurities from the receptacle.

5. In a candy-cleaning apparatus, the combination of resilient supports provided with bearings, shafts journaled in said bearings, an endless apron traveling around said shafts, means for vibrating the supports in unison during the course of travel of the apron, a candy-receptacle carried by the apron, brushes for cleaning the candy therein, means for operating the brushes, and means for discharging the dust and impurities from the receptacle.

6. In a candy-cleaning apparatus, an endless traveling shaking-apron, a receptacle carried thereby provided with fixed cleaning-brushes, movable brushes coöperating therewith, means for operating the apron and movable brushes, and means for discharging the dust and impurities from the receptacle.

In testimony whereof I affix my signature.

PAUL HAASE.

In presence of—
F. STEPHAN,
LEON ZEITLIN.